United States Patent [19]

Plumley

[11] Patent Number: 5,167,047
[45] Date of Patent: Dec. 1, 1992

[54] WIRE MANAGEMENT GROMMET

[76] Inventor: Roger K. Plumley, 266 S. Marengo, Pasadena, Calif. 91101

[21] Appl. No.: 861,643

[22] Filed: Apr. 1, 1992

Related U.S. Application Data

[63] Continuation-in-part of Ser. No. 770,019, Oct. 1, 1991, abandoned.

[51] Int. Cl.[5] .................. B65D 55/00; H01B 17/00; H02G 15/00
[52] U.S. Cl. ................................ 16/2; 174/153 G; 174/48; 248/56
[58] Field of Search ............... 16/2; 174/153 G, 48; 248/56; 312/223; D8/349, 356, 400

[56] References Cited

U.S. PATENT DOCUMENTS

| | | | |
|---|---|---|---|
| D. 285,044 | 8/1986 | Mockett | D8/354 |
| 3,783,175 | 1/1974 | Timmons | 174/48 |
| 3,956,573 | 5/1976 | Myers et al. | 174/48 |
| 4,053,701 | 10/1977 | Ogilvie et al. | 174/48 |
| 4,344,205 | 8/1982 | Latino et al. | 16/2 |
| 4,520,975 | 6/1985 | Cournoyer et al. | 248/56 |
| 4,730,363 | 3/1988 | Asbaghi et al. | 16/2 |

OTHER PUBLICATIONS

Doug Mockett & Co., "Annual Report to Our Clients and Friends", cover, inside cover and pp. 4 and 5 of 1989 stock catalog.
ITW Plastiguide "Stock Catalog", cover, inside cover and pp. 67 through 70, 1990.
New Products from Mold Rite Inc. 1 sheet, 1990.
Weber Knapp Company "Cord Grommet" cover and inside cover, 1990.
E. B. Bradley Co. "Specialty Hardware & Laminates" p. 262 (1 sheet), 1990.
The Slidex Corp. "Wire Management Products" cover sheet.
Outwater Plastic/Industries "Round Wire Management Grommets", 1990.

*Primary Examiner*—John Sipos
*Assistant Examiner*—Carmine Cuda
*Attorney, Agent, or Firm*—Christie, Parker & Hale

[57] ABSTRACT

A wire management grommet for routing wiring or cables through the surface of furniture articles comprises a liner and a cap having a slot opening and a captive closure member. A tongue and groove arrangement facilitates slidable movement of the closure member within the cap's slot opening. The closure member is locked into its closed position covering the slot through a detent mechanism. A pin and groove arrangement facilitates both the closure member's captivity to the cap and its downward pivoting movement away from the slot opening and into its retracted position. The closure member is stabilized, through interaction with the cap, when the closure member is in its open position. The operation of the closure member from its closed position covering the slot opening to its retracted position exposing the opening comprises three distinct movements.

27 Claims, 14 Drawing Sheets

5,167,047

WIRE MANAGEMENT GROMMET

CROSS REFERENCE TO RELATED APPLICATIONS

This application is a continuation in part of application Ser. No. 07/770,019, filed Oct. 1, 1991 now abandoned.

FIELD OF THE INVENTION

The invention relates generally to devices that allow wires to pass through surfaces of furniture, and, more specifically, to an improved grommet assembly possessing a slot opening and captive slot closure member which allows passage of wires and cables and their connectors through the surfaces of various types of furniture such as computer furniture, office desks, factory workstations, and the like.

BACKGROUND OF THE INVENTION

The principal utility of the invention is to provide a means for routing wires, cords and connectors from electrical devices through the surfaces of furniture articles to their intended destinations. The invention serves the practical needs of both protecting the wires from sharp unprotected edges caused from boring an access channel through the surface of a furniture article and of increasing the available surface workspace by channeling the wires neatly into discrete openings instead of running such wires across the surface of the furniture object.

Devices for routing wiring through the surfaces of furniture articles exist. One such device is shown in U.S. Pat. No. 285,044 of Mockett. This device comprises an annular liner member and a flat circular disk-shaped cap having a slot-like opening sized to accommodate the passage of wires or cords. The liner comprises a cylindrical sleeve and a collar that extends about the outer circumference of one end of the sleeve. The liner is inserted into a slightly larger sized hole bored in the surface of a furniture object until the collar of the liner comes to rests against the furniture's surface. The liner has a central bore which is relatively large to enable connectors and plugs to be passed through it; that opening is much larger than the opening required to accommodate the wires or cables to which the plugs or connectors are connected. The wiring or cord is then placed into the cap's slot-like opening and the cap is mounted within the liner until the underside of the cap rests against liner's collar. In its mounted position, the cap's top surface is above and not coplanar with the furniture surface. The cap closes the liner opening except for the slot in the cap through which the wires, cords or cables pass.

Another type of device is shown in U.S. Pat. No. 3,783,175 of Timmons. Like the Mockett device, this device comprises a liner member and a disk-shaped cap possessing a slot opening for the passage of an electrical cord through an office desk. The liner in this device does not contain a collar like the liner in Mockett. The liner is inserted into a slightly larger hole bore in the surface of the office desk such that one of its ends is slightly recessed from the surface of the office desk. The electrical cord is then placed into the cap's slot opening and the cap is then mounted within the sleeve. Unlike Mockett, when mounted within the liner, the cap's surface is coplanar with the surface of the office desk.

Another type of device is shown in U.S. Pat. No. 4,053,701 of Ogilvie et al. This device comprises a liner member and a cap member having a slot opening for the passage of wires through the surface of a furniture article. The liner member comprises a three sided U-shaped sleeve. The sleeve is slidably inserted into a slightly larger U-shaped channel cut into the surface of a furniture article proximate a marginal edge. The cap comprises a rectangular flat disk that is slid into the U-shaped liner such that the cap's outer marginal edge is coterminous with that of the furniture object. Wiring is then inserted into the cap's opening and through the surface of the furniture article.

Devices of the kind reviewed above are known in the furniture industry as wire management grommets. The devices in Mockett, Timmons, Ogilvie et al have a disadvantage. They do not provide cover for the cap opening when the grommet is not in use, i.e., when no wires or cords are passed through the hole in the work surface in which the device is installed. Thus, when not being used to route wiring through the surface of a furniture article, the furniture surface is left with an open hole. This is aesthetically undesirable. It is also functionally objectionable. Material on the work surface can fall through the open hole.

For maximum utility and convenience a grommet that is not in use should provide a means to cover the unused opening, a means that is readily available, easy to use and which, when placed in position, is as inconspicuous as possible. Accordingly, a device that provides for convenient, complete and secure covering of the cap opening when not in use is highly desirable.

Devices which address the need to provide a closure for a cap opening in wire management grommets are known. These devices are similar to those described above. But they also provide a separate cover or closure that can be placed in the cap opening when the opening is not being used for the passage of wires or cables. However, their utility is limited. Because the cap opening cover is not captive to the cap, it can be easily lost or misplaced.

Other devices have tried to remedy this security problem by providing a storage receptacle in the underside of the cap for the separate closure member. While an improvement, it is less than an ideal solution. Because the cap opening cover is separate, it can be easily dislodged from its storage position and lost. For best security, the cover should be a captive part of the cap.

A device that attempted to address this latter problem is shown in U.S. Pat. No. 4,730,363 of Asbaghi. This device comprises a annular liner and a flat-topped cylindrical cap having both an opening and a retractable closure for that opening movably held captive to the cap. The liner comprises a cylindrical sleeve and a collar extending about the circumference of one of the sleeve's ends. The liner is inserted within a slightly larger hole bored into the surface of a furniture article until the collar's underside rests against the surface of the furniture object. The cap is then inserted within the liner until the cap's underside comes to rest on the collar's top surface. The cap contains a closure or lid captive to the cap and which can be positioned to cover the cap opening when not in use, i.e., when no wires or the like are passed through the cap opening. A retaining rail depends from the underside of the cap and is positioned across the closed-end portion of the slot-like cap opening such that a gap, equal to the thickness of the lid, exists between the retaining rail and the closed end of the opening. The lid resides within the gap and comprises a bar depending from the underside of the lid positioned across the width of the lid proximate its end communicating with the closed end of the cap opening. The length of the bar is greater than the width of the gap. Accordingly, when pulled upward and away from the cap's top surface, the lid is prevented from disengaging the cap through interaction between the retainer rail and the bar. The lid also comprises a lip that depends from the underside of the lid which restricts the downward travel of the lid through the gap. In the closed position, the lid covers the cap opening and is coplanar with the cap's top surface. To expose the cap opening, the marginal edge of the lid is lifted upward causing the lid to slide loosely downward within the gap until the lid's lip comes into contact with the cap's retainer rail.

Although this device addresses the need for furnishing a captive member to cover the cap opening, it has several disadvantages. In the vertical stored position, the slot cover hangs from the center of the cap. This leaves the cover as well as its support mechanism clearly visible, a feature that is aesthetically undesirable. The design also allows the tip of the cap cover to protrude above the surface of the cap thus creating an irritating obstruction in an otherwise smooth work surface. Hanging the cover from the center of the cap also has a functional disadvantage. The cover hangs in a position adjacent to the opening and can hinder the clear passage of wires or cables through the cap opening.

Further disadvantages of the current art relate to the integrity of the cover when placed within the cap opening. Friction between cap and cover surfaces or between cover and liner surfaces is commonly relied upon to keep the cover securely in position within the cap opening. The disadvantage is that as the contact surfaces wear, the cap and cover become less secure. In cases where the contact is between the cover and interior liner surface, when the cap is removed from the liner, the cover is unsupported and easily falls out of the cap opening.

In a device for routing wires and cords from electrical devices through the surfaces of furniture articles to their intended destinations, it is highly desirable that the device comprise a captive cover to close the cap opening when not in use. A need exists for such a wire management grommet device which is free of the deficiencies noted above.

SUMMARY OF THE INVENTION

This invention addresses the need identified above. It does so by providing a wire management grommet assembly which includes a cap having an improved closure member for closing an opening in the cap. The closure member is movably captive to the cap in such a manner that the closure member is held firmly in its closed position and cannot inadvertently be moved from it. Also, the closure member, when moved to its open position, does not extend above the cap surface and does not interfere with wires, cords or cables engaged in and passing through the cap opening. These benefits are achieved in an assembly which is reliable, efficient and easy to use.

Generally speaking in structural terms, this invention provides a cover for a wiring aperture through a surface of an item of computer furniture and the like. The cover comprises a cap-like plug member and a closure member for an opening formed in the plug member. The plug member includes a body having a planform shape similar to but larger in dimension than a selected wiring aperture to be covered. Projection means depend from a reverse surface of the body for mating with the boundaries of the aperture with a peripheral margin of the body in overlying relation to the surface in which the aperture is present. The projection means are located on the body about a space located substantially centrally of the body; the space opens away from the body reverse surface. A plug member opening is defined in the body. The opening extends from an inner portion of the body to and through the peripheral margin of the body. The closure member for that opening is held captive to the body in a manner which affords movement of the closure member relative to the body between closed and open positions. In its closed position, the closure member closes the body opening and has an edge essentially continuous with the body peripheral margin adjacent the opening. In its open position, the closure member depends from the body reverse surface in the space without projection above an obverse surface of the body at such a location in the body that the body opening is fully open. The closure member has an obverse surface which is substantially flush with an obverse surface of the body in the closed position of the closure member in the body. There are means which cooperate between the plug and closure member for releasibly holding the closure member in its closed position.

The cover can be used directly in the aperture in the item of computer furniture and the like, if desired. Preferably the cover is used in combination with a tubular liner which is placed in that aperture, and the cover is placed in the liner. The plug member can have circular, rectangular or other planform configurations as desired, and there can be more than one plug member positionable in a given liner. Where plural plug members can be used with a rectangular liners, it is advantageous that the liner opening have an aspect ratio (ratio of length to width) of 2.

BRIEF DESCRIPTION OF THE DRAWINGS

The above-mentioned and other features of the invention are more fully set forth in the following description of the presently preferred and other wiring grommets, which description is presented with reference to the accompanying drawings in which.

DESCRIPTION OF THE ILLUSTRATED EMBODIMENTS

Figure 1:
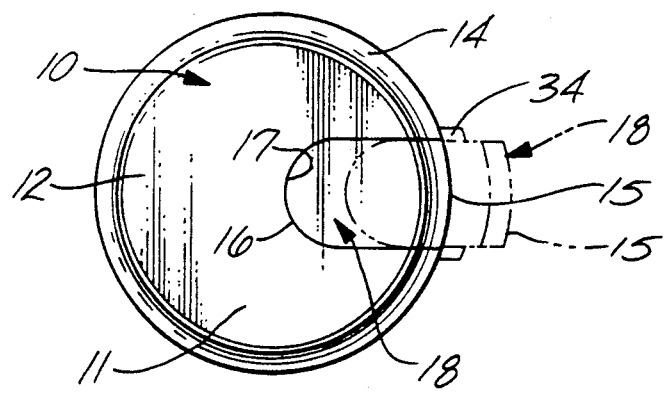
FIG. 1 is a plan view of the top surface of the presently preferred wire management grommet.

In an exemplary embodiment shown in FIGS. 1-10, a wire management grommet 1 affords passage of wiring and cords through an aperture 2 formed in the surface 3 of a furniture article 4; surface 3 can be countersunk around aperture 2, if desired. The grommet comprises a generally circular annular liner 46 and a complementary generally circular, disk-shaped cap 10; see FIG. 10. The liner and cap may be molded from plastic, metal, or the like which may be colored in a manner suitable for use with a variety of home, office, or work furniture. The cap cooperates with the liner in the manner of a plug for the central passage through the liner.

Figure 7:
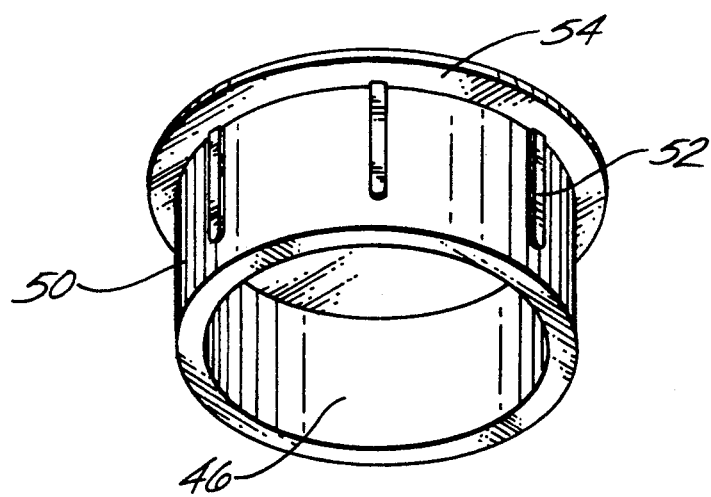
FIG. 7 is a bottom perspective drawing of the liner of the wiring grommet.

As shown in FIG. 7, liner 46 comprises an annular sleeve 50 that is cylindrical in shape. A collar 54 is integral to the sleeve and extends perpendicularly outward from one end of the sleeve forming a lip about the circumference of the liner. Aperture 2 is formed in the surface 3 of the furniture article and is sized to accommodate the insertion of the liner sleeve. Collar 54 serves two functions, first to limit the insertion of the liner within the hole of the furniture article through contact of the collar with the surface of the furniture article, and second to provide a uniform surface upon which to mount cap 10. A plurality of ribs 52 extend from the outside surface of the liner and are positioned parallel to the length of the sleeve. The ribs serve to ensure that the liner fits snugly within the aperture in the furniture article.

Figure 21:
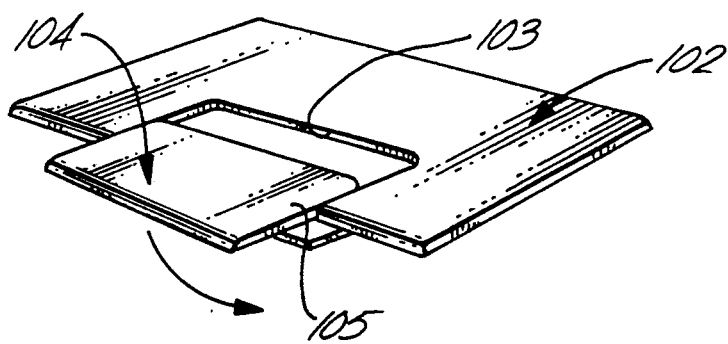
Figure 22:
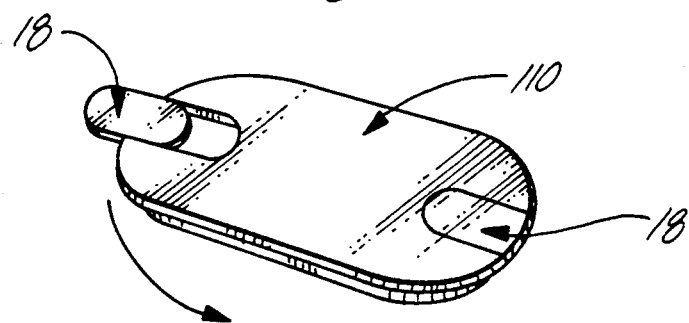

FIG. 1 shows the top (obverse) surface 11 of a body of cap 10 has an opening 16 in which is located a closure member 18. The closure member is shown in its closed position in solid lines in FIG. 16, and in broken lines in an extended position which is discussed more fully below. In the closed position, the closure member is fully inserted into opening 16. In this position, the opening is completely closed by the closure member with a top (obverse) surface 13 of the closure member being coplanar with the cap surface 11 and having an end edge 15 coterminous with a beveled peripheral edge 14 of the cap. In the extended position, the closure member 18 has been slidably moved in opening 16 outwardly away from a closed end 17 of that opening located at a substantially central position of cap body 12. The closed end 17 of opening 16 preferably is arcuately curved as shown in FIG. 1; however, see FIG. 21 for a cap opening of different configuration. In the extended position, the top surface 13 of the closure member remains coplanar with cap surface 11; however, its end marginal edge 15 now lies outwardly of cap edge 14. Opening 16 in cap 10 is in the form of a wide slot extending radially of the cap from a central place in the cap to the cap perimeter; opening 16 has opposing parallel sides between its closed end 17 and the cap perimeter. As set forth below, cap openings having different geometries are possible in a wire management grommet according to this invention.

Figure 2:
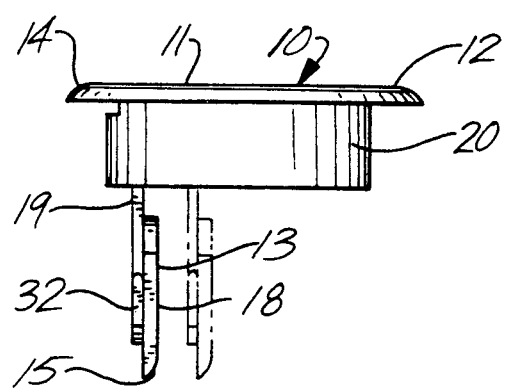
FIG. 2 is a side elevational view of the grommet cap with the closure member in its retracted or open position.

FIG. 2 shows a side view of cap 10 with the closure member 18 in its retracted position perpendicular to the underside of the (reverse surface) cap body. The closure member's initial retracted position is shown in broken lines and is achieved by rotating the closure member downward from its extended position shown in broken lines in FIG. 1. The closure member's final retracted position is shown in solid lines in FIG. 2 and is achieved by slidably translating the closure member laterally in the body from its initial retracted position in a direction away from slot opening 16.

In the final retracted position of the cover relative to the cap, the slot opening is completely uncovered, permitting ready and convenient passage of wiring and such through the slot opening. Also shown is the cap's continuously beveled edge 14 and the complementary edge 15 of the closure member. A skirt 20 is shown to depend from the underside of the cap body.

Figure 3:
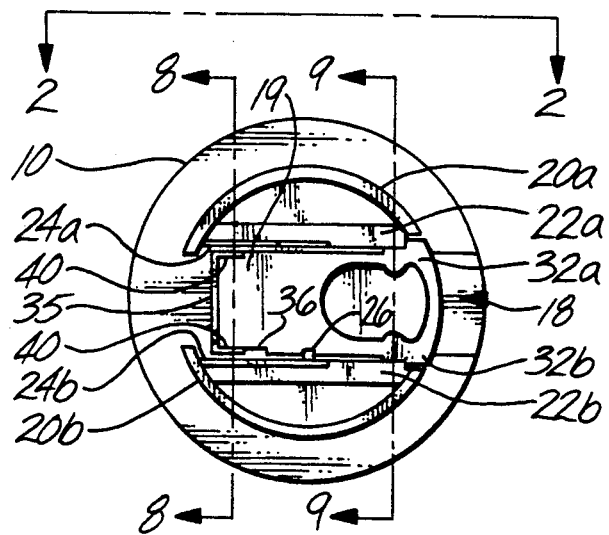
FIG. 3 is a plan view of the underside of the cap with the closure member in its closed position.

FIG. 3 is a bottom plan view of cap 10 with the closure member 18 in its closed position completely covering and closing the slot opening 16. The closure member 18 can be seen residing between a pair of ribs 22a and 22b preferably formed integral to cap 10 and depending from its underside parallel to each of the preferably parallel sides of the slot opening. The ends of ribs 22 terminate through contact with the inside wall of the skirt. A stop 26 extends from one rib 22b into the path of sliding motion of the closure member in the cap. The stop serves two functions, one being to limit the outward travel of the closure member from its closed to its extended position, and the other to restrict the travel of the closure member towards the open end of the slot opening while perpendicular to the cap (see FIG. 5), thereby keeping the closure member captive to the cap. A stop clearance opening 36, formed in the adjacent edge of the closure member (see FIG. 6) in a tang portion 19 of the closure member, is registerable with the stop 26 to permit the free pivotal movement of the closure member from its fully extended position (FIG. 1 broken lines) downward relative to the cap body (to the position shown in broken lines in FIG. 2) without interference by the stop.

Figure 4:
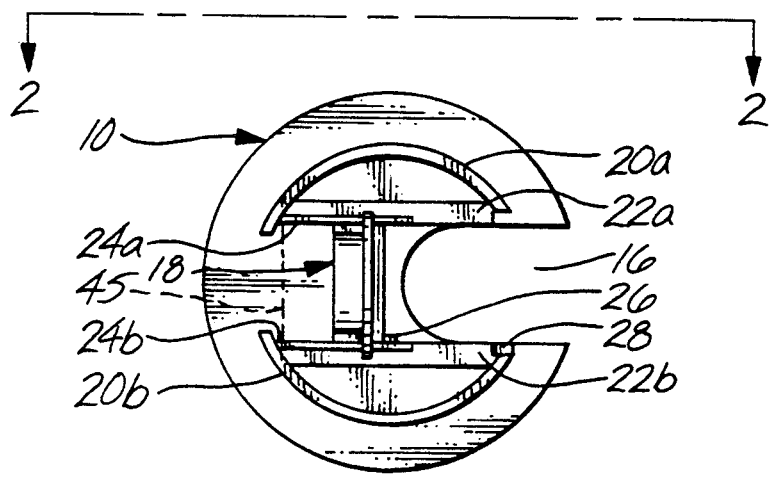
FIG. 4 is a bottom plan view of the cap with the closure member in the retracted position.

FIG. 4 is a bottom plan view of the cap with the closure member 18 in a retracted position perpendicular to the cap's underside surface. In this position the slot opening is completely uncovered. The stop 26 can also be seen performing its function of restricting the closure member's travel into the slot opening while in this retracted position.

Figure 5:
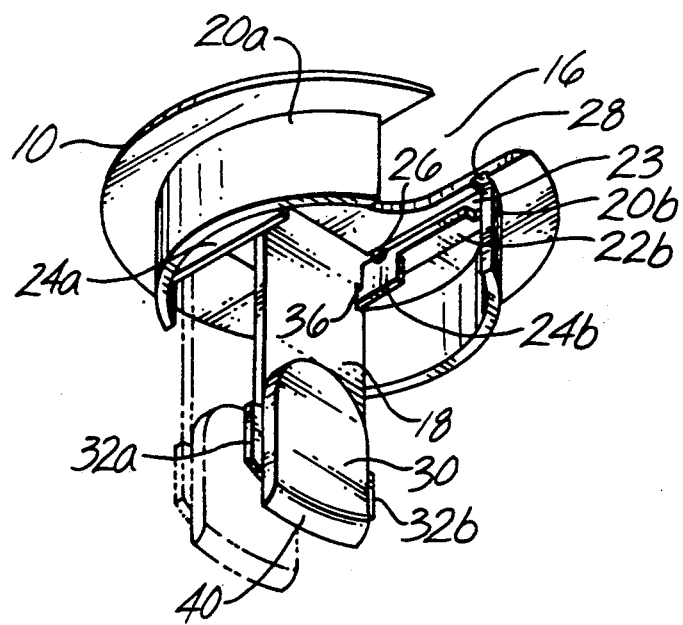
FIG. 5 is a bottom perspective drawing of the cap with the closure member in the retracted position.

FIG. 5 is a bottom perspective view of the cap's underside showing the slot closure member 18 in solid lines in its initial retracted position perpendicular to the cap's surface. The closure member's final retracted position, translated away from the slot opening 16, is shown in broken lines. The cap 10 is fitted to the liner 46 through interaction between the liner sleeve 50 and the skirt 20 which preferably is integral to the underside of the cap. The skirt depends from the underside surface of the cap in the range of from ¼ to 1 inch and is configured to nest snugly within the liner sleeve. The cap is inserted within the liner until the cap's underside comes to rest on the top surface of the liner collar 54. A pair of grooves 23 are shown to exist between each rib 22a and 22b and the underside surface of the cap. A pair of flanges 24a and 24b are shown to extend from the lower surface of each rib in a direction away from the body reverse surface from a location on each rib near the closed end of slot opening 16 to the end of rib remote from that opening. The flanges cooperate with the wall sides of the closure member in its tang portion and serve to stabilize the closure member's sliding and vertical movement within the cap.

Figure 6:
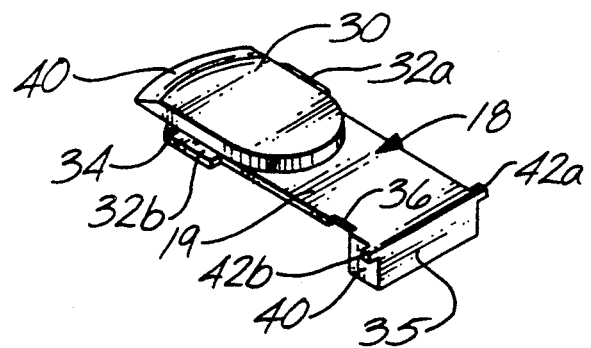
FIG. 6 is a top perspective drawing of the closure member.
Figure 9:
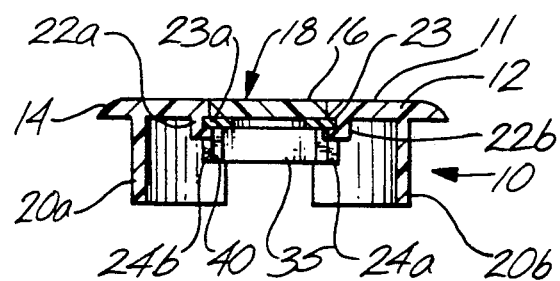
FIG. 9 is a cross-sectional elevation view taken along line 9—9 in FIG. 3.

FIG. 6 shows the closure member and its preferably integral components. A boss 30 extends outwardly away from the top surface of the closure member proximate to the end cooperating with the slot opening. The boss is sized and shaped to both complement the configuration of the slot opening and to exist in a coplanar arrangement with the cap while in its closed position. A tongue 32 extends perpendicularly outward from each side of the closure member proximate the boss. The tongues 32a and 32b are sized to permit slidable cooperation within their respective groove 23 formed in respective ribs 22a and 22b as shown in FIGS. 3, 5 and 9. The tongue and groove interaction facilitates the slidable movement of the closure member within the cap from its closed position to its extended position. A detent boss 34 extends upwardly from the surface of one of the tongues 32b. The detent boss is positioned to cooperate with a detent recess 28 (see FIG. 5), located on the cap's underside surface proximate the slot opening, when the closure member is slid from its extended position into the slot opening. The coaction of the detent boss in the detent recess provides a releasable latch which holds the closure member in its closed position in the cap.

Figure 8:
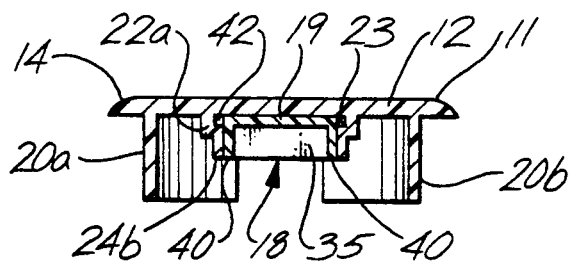
FIG. 8 is a cross-sectional elevation view taken along line 8—8 in FIG. 3.

A base flange 35 is positioned proximate the end of the closure member opposite the boss, as shown in FIGS. 3, 6 and 8. The base flange extends perpendicularly outward from the distal end of the closure member tang and serves to limit its pivotal motion in the cap to a position perpendicular to the cap's underside surface. A wall 40 extends forwardly (toward closure member end 15) from each of the two opposite edges of the base flange. Walls 40 cooperate with cap flanges 24 upon movement of the closure member within the cap to stabilize the closure member's downward vertical (hinging) movement and to minimize unwanted lateral movement.

A pin 42 extends perpendicularly outward from each of the two long edges of the closure member in the plane of the base flange 35. The pins 42a and 42b are sized to slidably and hingeably interact within their respective grooves 23 as shown in FIG. 8.

Closure member 18 is captive to cap 10 through the cooperation between pins 42 and the respective grooves 23. The configuration of the cap and its components ensures the captivity of the closure member through constant pin and groove interaction by two distinct mechanisms. The stop 26 serves to restrict the movement of the closure member towards the pair of groove openings proximate the mouth of the slot opening while the interference between the inner wall of the skirt 20 and walls 40 prevents the closure member from sliding out the distal ends of grooves 23. The closure member preferably is introduced between the ribs of the body to a position perpendicular to the underside of the cap and is snapped, by a twisting motion, into its installed position such that the pins 42 are contained within each respective groove 23 and thereafter are captive to the body.

Figure 10:
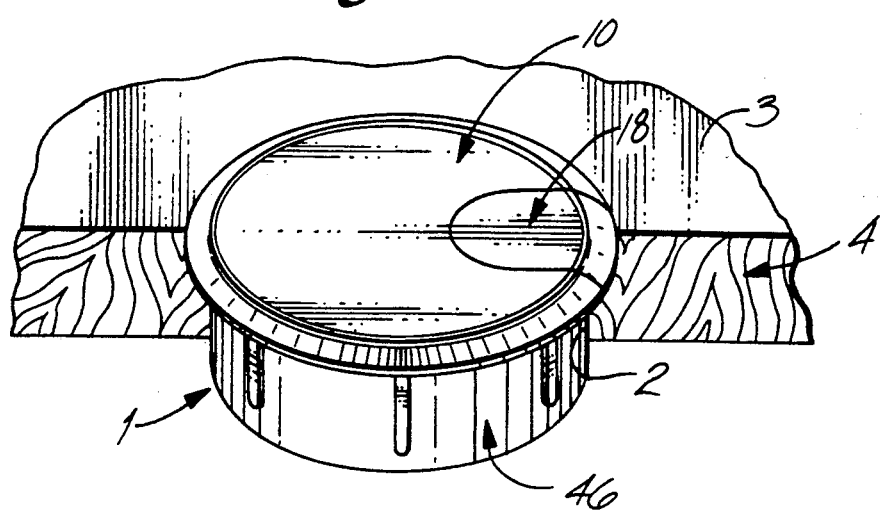
FIG. 10 is a top perspective view of the assembled wire management grommet assembly in a wiring aperture in an item of furniture, for example.
Figure 11:
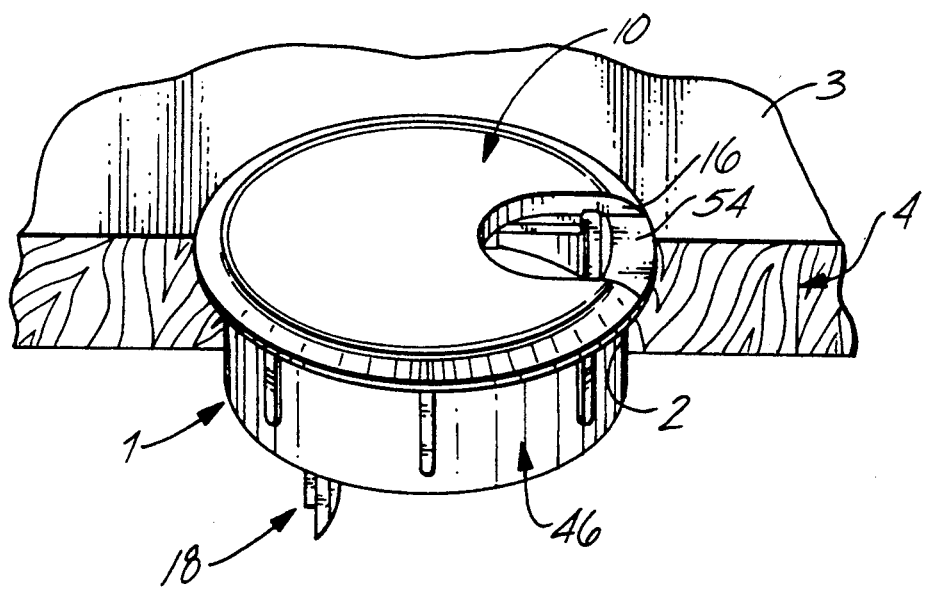
FIG. 11 is a top perspective view of the assembled wire management grommet assembly in a wiring aperture in an item of furniture, with the closure member in its retracted or open position.
Figure 24:
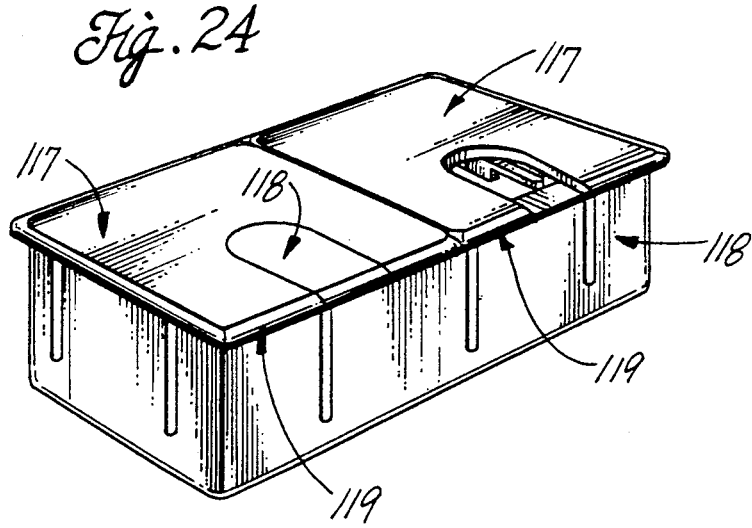
Figure 30:
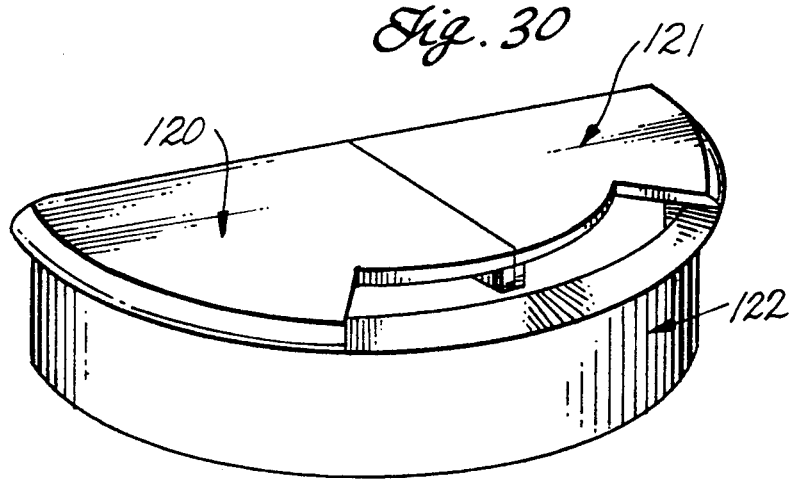

To use the wire management grommet, a wiring aperture must first be formed in the surface of the desired furniture article. The aperture is sized to snugly accommodate an approximately similarly shaped liner sleeve 50. Liner 46 is then inserted into the aperture until the bottom surface of the collar comes to rest on the furniture surface, or on a countersunk surface in surface 3 around the aperture in those cases where it is desired that the top of the installed grommet be flush with the furniture surface. The appropriate wire or cable plugs or connectors are passed through the liner. The wiring is then placed in slot opening 16 and the cap is installed by inserting the cap skirt 20 within the liner sleeve until the cap's underside surface comes to rest against the top surface of the liner collar. The liner may accommodate a single cap or multiple caps depending on the particular configuration of liner chosen. FIG. 24 shows an aspect ratio of 2:1 between square shaped caps and a rectangular shaped liner. FIG. 30 shows an aspect ratio of 2:1 between quadrant shaped caps and a semi-circular shaped liner. The liner will accommodate the cap with the closure member in either its closed or retracted position. FIG. 10 shows the wiring grommet installed with the closure member in its closed position covering the slot opening. The cap must be removed from the liner when it is desired to change the closure member's position in the cap to open the slot opening. FIG. 11 shows the wiring grommet installed with the closure member in its open position retracted within the body.

Three distinct modes of motion pertain to the movement of closure member 18 from its closed position in slot opening 16 to its fully retracted position perpendicular to the underside surface of cap 10. Those modes are slide, pivot and translate. First, from its closed position, the closure member is slid outwardly in the slot opening so that boss 30 moves away from the closed end 17 of the opening. This causes the detent mechanism 28, 34 to uncouple permitting the closure member to slide easily through the cooperation between the tongues 32a and 32b and grooves 23. After the detent mechanism has uncoupled, the closure member is further extended, causing the tongues to travel past the grooves 23 (see FIG. 1). The outward extension of the closure member is complete when the pertinent one of walls 40 engages the stop 26. In this position the closure member is fully extended with the tongue and groove arrangement completely disengaged.

Next, from its fully extended position, the closure member is hingedly pivoted downward and away from the cap top surface. The hingeable movement is facilitated through cooperation between the closure member pins 42 and cap grooves 23. The hinging movement of the closure member is stabilized through the interaction between cap flanges 24 and closure member walls 40. The closure member's downward rotation is complete when base flange 35 abuts the underside surface of the cap between ribs 22. In this position, the slot closure is completely retracted from the slot opening and lies perpendicular to the cap.

While in the hinged and retracted position perpendicular to the cap, the closure member is slidably translated laterally to a position in the cap spaced from opening 16; such position is represented by the broken line 45 in FIG. 4. This sliding movement is facilitated through the interaction between the pin and groove arrangement of the closure member and cap, respectively. The sliding movement of the closure member within the cap is also stabilized through the same flange and wall cooperation that served to stabilize the closure member's hinging movement.

The wire management grommet of the present invention has the advantage of having a closure member that is captive to the cap. Because the closure member is captive into the cap, it cannot become lost or misplaced after removal from the slot opening when the device is to be used. Also, the closure member is inconspicuous and out of sight when the device is being used. It is aesthetically pleasing to see only the clean routing of wires from the furniture surface. Further, the closure member can be translated away from the closed rear end of the slot to be out of the way and to not interfere with the actual routing of the wires through the device.

The wire management grommet of the present invention has the additional advantage of having a captive closure member that is firmly locked into its position covering the slot opening. The locking feature is desirable since it keeps the closure member within the slot opening whether within or out of the liner unit.

Figure 12:
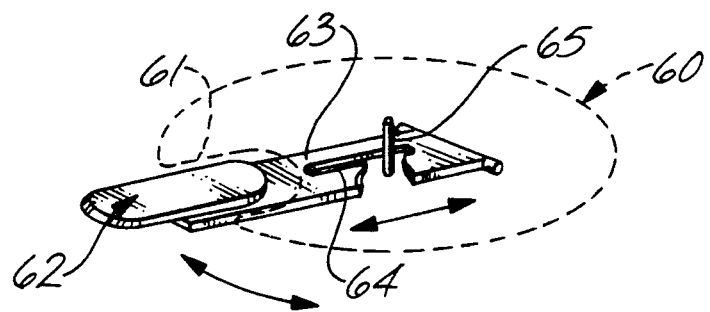
FIGS. 12-19 are fragmentary perspective drawings of alternative embodiments of connections between the cap and the closure member in other wire management grommets according to this invention.
Figure 13:
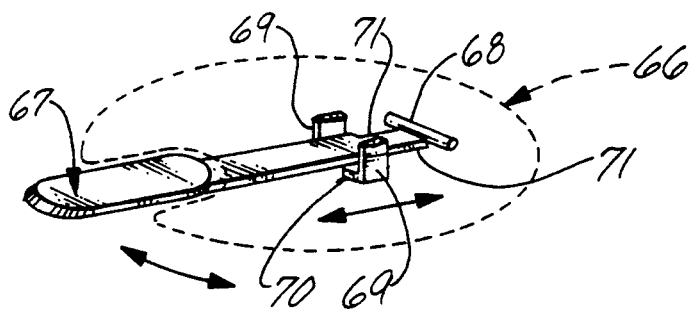

The foregoing descriptions pertain to a presently preferred wire management grommet assembly according to this invention. The benefits and advantages of the invention can be achieved in caps having different connection arrangements between the cap and closure member for providing and affording suitable relative motions while keeping the closure member captive to the cap. For example, FIGS. 12 and 13 schematically illustrate other arrangements for limiting the outward extension of the slot closure relative to the cap. In FIG. 12, a cap 60 has a slot opening 61 in which a closure member 62 is similar to closure member 18 except that, in a tang portion 63, it defines a slot 64 which has a length between its closed ends which corresponds to the amount of sliding motion experienced by the closure member in moving between its closed and extended positions in the plane of the cap. The slot cooperates with a pin 65 which depends into it from the underside of the cap. The pin engages the closed ends of the slot to provide a stop limiting sliding motion of the closure member in the cap without interfering with the ability of the closure to pivot and to translate in the cap.

The arrangement shown in FIG. 13 uses a cap 66 and a closure member 67 which is similar to closure member 18. At its distal end, the closure member carries a hinge axle 68 which extends outwardly of the long sides of the closure member, the ends of which can cooperate in guide grooves (not shown) similar to those shown above. A pair of lugs 69 depend from the underside of the cap on opposite sides of the closure member for guiding the closure member in its sliding motion in the cap. The lugs have in-turned lower ends 70 which extend under the tang portion of the closure member to hold the closure parallel to the cap until the axle ends about the lugs in the extended position of the closure member relative to the cap, at which point the lug ends 70 register with notches 71 formed in the tang edges immediately forward of axle 68. Such registration allows the closure member to be pivoted relative to the cap to clear it from the cap slot opening.

Figure 14:
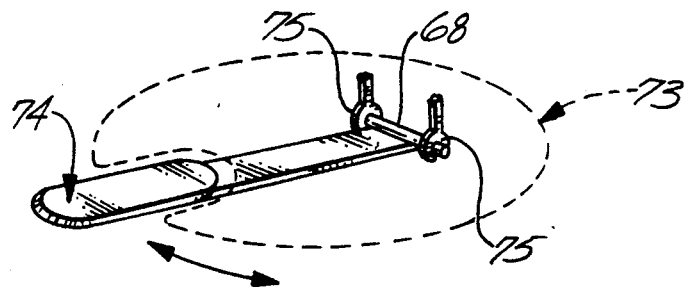
Figure 15:
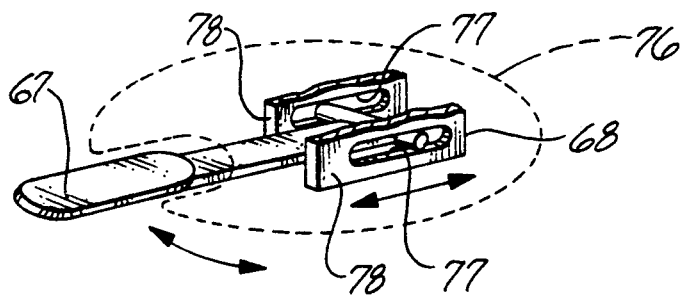
Figure 16:
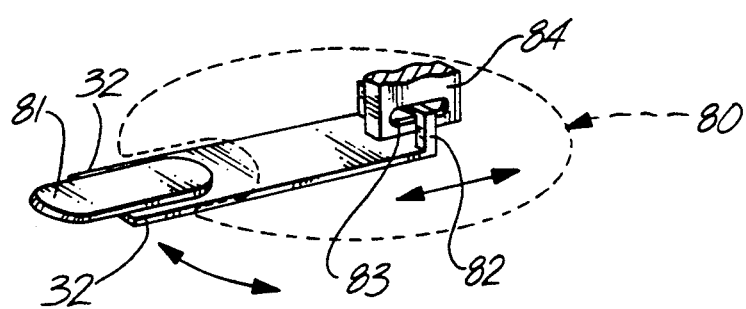

FIGS. 14, 15 and 16 schematically illustrate arrangements for hinging the closure member in the cap. In cap 73 (FIG. 14), closure member 74 carries a transverse hinge axle 68 at its distal end. The ends of the axle cooperate rotatably in openings formed in hinge lugs 75 which depend from the cap on opposite sides of the closure member in substantially spaced relation to the closed end of the cap slot opening. The closure is movable only hingeably relative to the cap between a closed position in the slot opening and an open position in which it depends from the cap well to the rear of the slot opening and is out of the way as wires and cables pass through the cap.

Cap 76 (FIG. 15) has a closure member 67 which carries a transverse hinge axle 68 at its distal end. The projecting ends of the axle cooperate in elongate slots 77 formed in elongate lugs 78 which depend from the cap along the sides of the tang portion of the closure member for guiding the closure member in slidable motion parallel to the plane of the cap. The axle is captive in the lug slots. The axle provides for pivoting and for translation of the closure member relative to the cap in a manner consistent with the foregoing description of cap 10.

Cap 80 (FIG. 16) has a closure member 81 which carries tongues 32 adjacent its proximal end for cooperation in grooves defined by the cap to guide the closure member in sliding relative to the cap. At its distal end, the closure member carries a transverse bridge 82 which extends above the tang position and through an elongate slot 83 in a lug 84 which depends from the cap. The cooperation of bridge 82 and lug 84 enables the closure member to pivot downwardly from its extended position (defined by the forward end of slot 83) and to translate in the cap to a limit defined by the distal end of slot 83.

Figure 17:
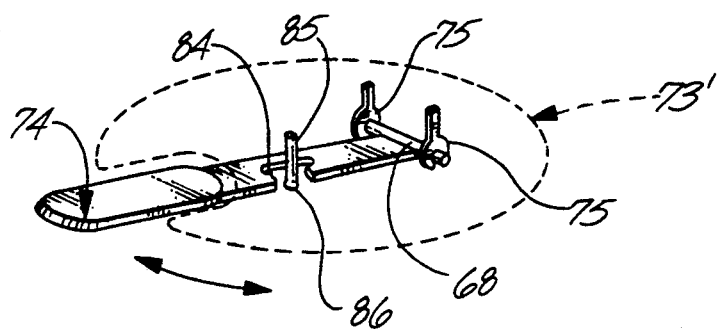

Cap 73' shown in FIG. 17 is a modification of cap 73. A slot 84 is formed through the tang portion of closure member 74. A pin 85 having a bulbed lower end 86 depends from the cap and into and through slot 84 when the closure member is in its closed position in the cap. The bulbed end of the pin has an interference fit with slot 84 and serves as a releasable detent to hold the closure member in its closed position.

Figure 18:
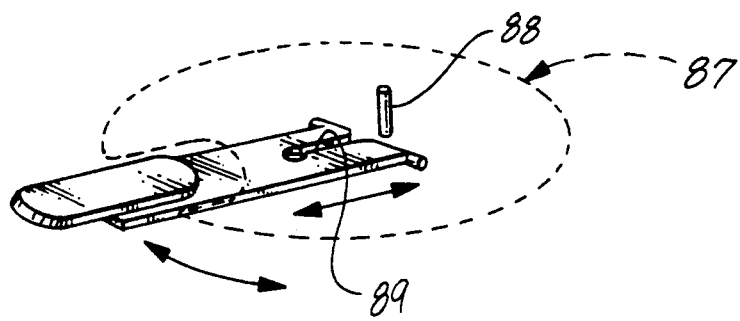

FIG. 18 shows that a pin and slot detent mechanism of the kind described with reference to FIG. 17 can be used in association with the distal end of a closure member which is slidable in the cap as well as pivotable and translatable. Cap 87 has a pin 88 which depends from its reverse surface and which cooperates in a slot 89 disposed parallel to the length of the closure member and which opens to the distal end of that member. The pin disengages from the slot when the closure member is slid in the cap from its closed to its extended position to become free for hinging motion. The pin does not hinder the closure member in pivoting and translating relative to the cap in moving from its extended to its fully open and retraced position in the cap.

Figure 19:
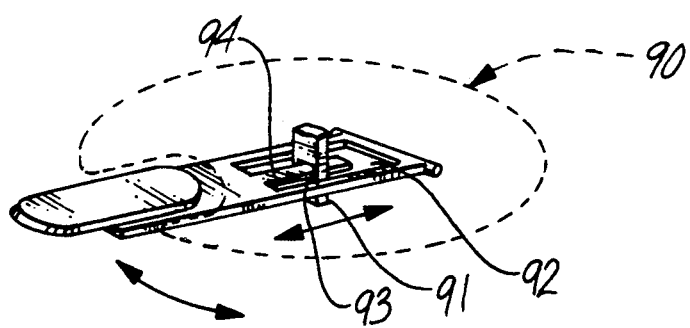

Cap 90 (FIG. 19) provides a lug 91 which depends from the cap into an elongate opening 92 formed in the central part of the closure member tang portion between its boss and its laterally extending distal axle projections. The lug has an opening 93 in its lower end which cooperates with a finger 94 which extends rearwardly from a forward edge of opening 92. The finger and opening 93 are engaged when the closure member is in its closed position and during an initial part of the sliding movement of the closure member from its closed position toward its extended position. Such engagement holds the closure member parallel to the cap and guides it linearly in such motion. The finger disengages from the lug opening when the closure member reaches its extended position. The closure member can thereafter pivot downwardly relative to the cap and can then translate in the cap to its retracted open position rearwardly from the closed end of the cap slot opening. The lug prevents the closure member from translating toward the cap slot opening out of captive engagement with the cap.

Figure 20:
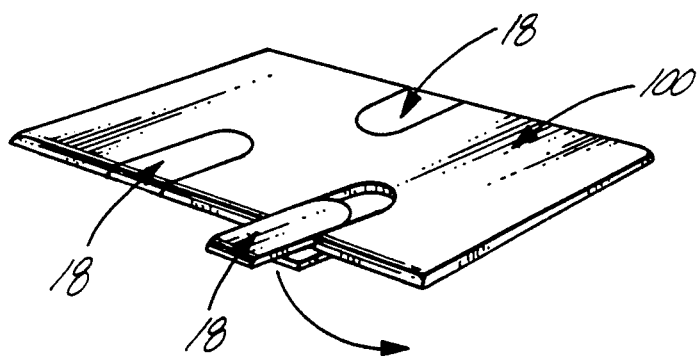
FIGS. 20-31 are views of grommet caps and liners having geometries different from the circular structures shown in FIGS. 1-19.

FIGS. 20-32 show geometries of wire management grommets according to this invention which are different from the circular grommet assembly shown in FIGS. 1-11, each of which preferably includes at least one cap opening closure member which has the same motion guiding, detenting, enabling and limiting structural interrelation to its cap member as closure member 18 has to cap 10 as set forth in the foregoing description pertinent to FIGS. 1-11. A rectangular cap 100 (FIG. 20) of suitable plan length and width includes three closure members 18 which cooperate with respective marginal slot openings in the cap. Two closure members cooperate with one of the long edges of the cap, and the third one cooperates with the other cap long edge, preferably centrally between the first two closure members. A further rectangular cap 102 (FIG. 21) has formed in one long side thereof a marginal slot opening 103 which has a width parallel to the length of the cap which is greater than its depth parallel to the width of the cap. A single closure member 104 has a boss portion 105 which is shaped correspondingly to the shape of opening 103.

Figure 23:
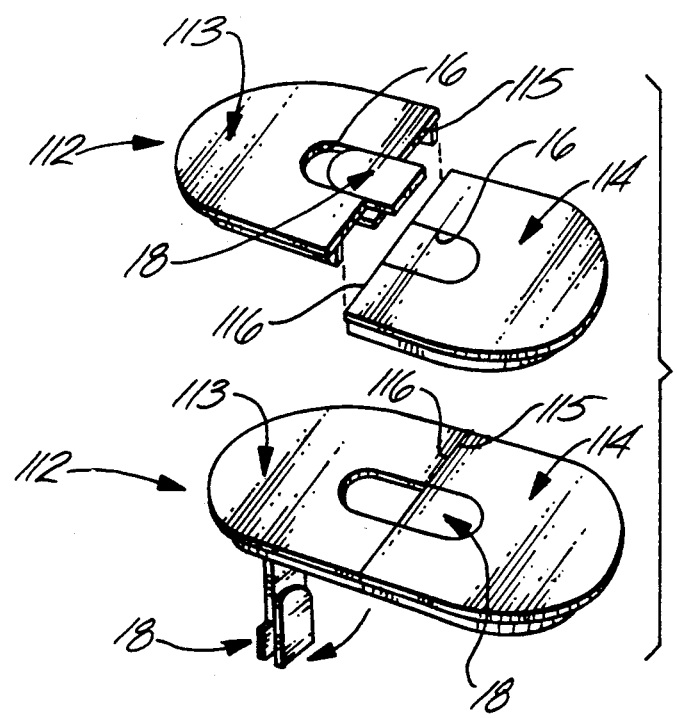

Cap 110 (FIG. 22) is configured for use in a furniture wiring aperture which is elongate and has arcuately curved ends. Cap 110 has a marginal slot opening in each of its opposite ends with which a closure member 18 cooperates in the manner described above. FIG. 23 shows a cap 112 which has an overall configuration the same as or similar to that of cap 10 but which is divided in half transversely into two cooperating cap parts 113 and 114 which register with each other along abutting preferably straight edges 115 and 116, respectively, when the cap is assembled in a furniture wiring aperture. The cap parts can be and preferably are identical. Each has a slot aperture 16 formed in it along its straight edge centrally of the length of that edge, and a closure member 18 is carried by each cap part for cooperation with that slot opening in the manner described above. In use, one or the other or both of the slot openings in the two cap parts can be opened to provide a passage for one or more wires or cables through the central position of cap 112.

Figure 26:
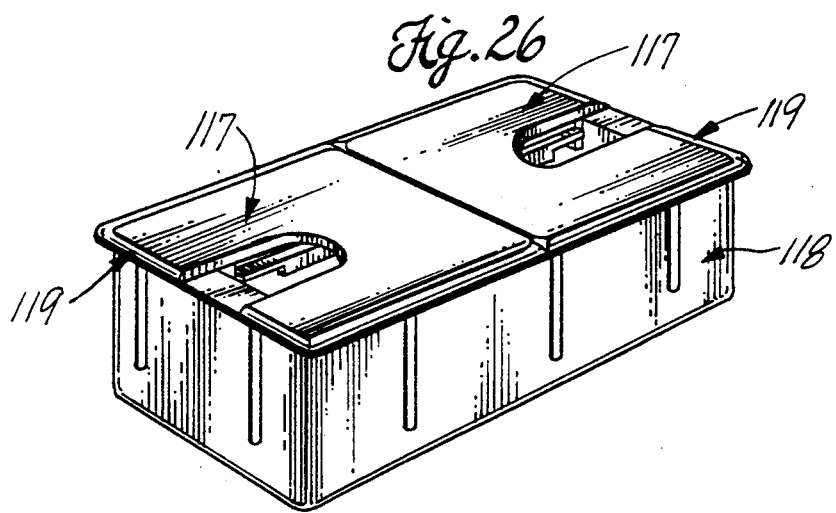
Figure 27:
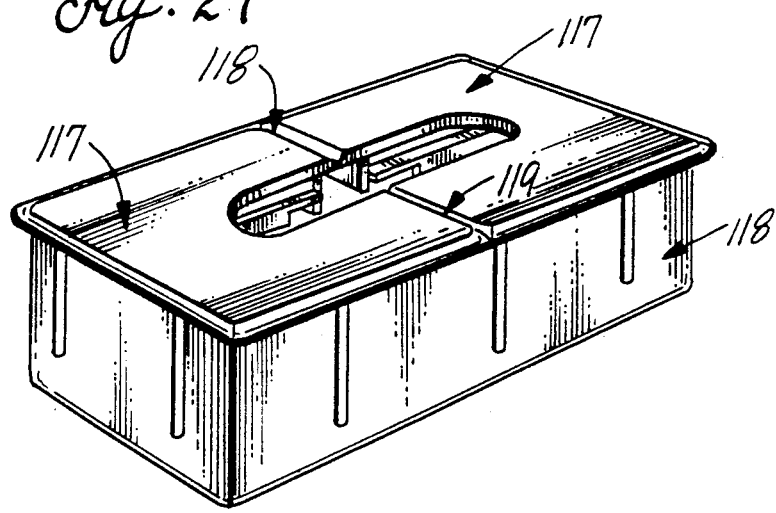

Cap 117 (FIG. 24) is configured in the shape of a square for use in a furniture wiring aperture or liner 118 that is either square or rectangular in shape. Cap 117 has a marginal slot opening at one of its edges 119 with which a closure member 18 cooperates in the manner described above. FIG. 24 shows a pair of identical square caps 117 combined together to fit within a rectangular liner 118 having a width approximately equal to the dimension of the square cap and a length equal to twice the width. Upon insertion within the rectangular shaped liner, three edges of each cap cooperates with the liner while the caps register with each other along abutting edges. The position of the slot openings within the rectangular liner is dependant upon which of sixteen possible ways the caps are combined. FIG. 24, 26, and 27 shows the three possible combinations that result from combining the caps in a symmetric manner. FIG. 24 shows the caps symmetrically arranged with the marginal edge of each slot opening 119 in cooperation with a common length of the rectangular liner 118.

Figure 25:
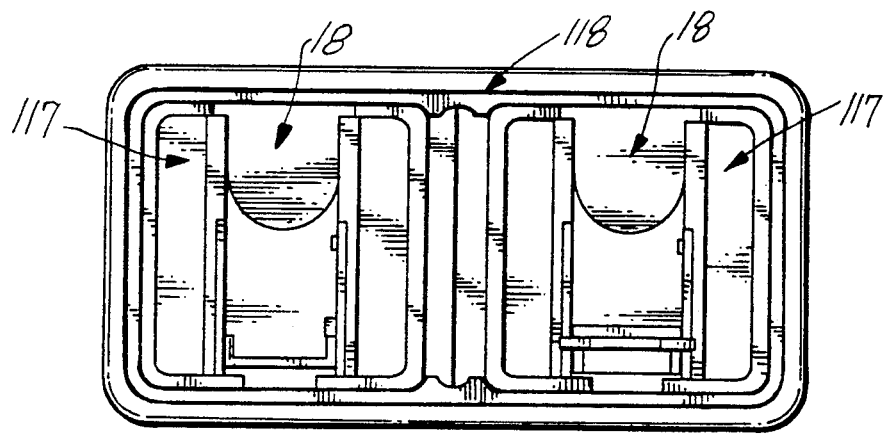
Figure 28:
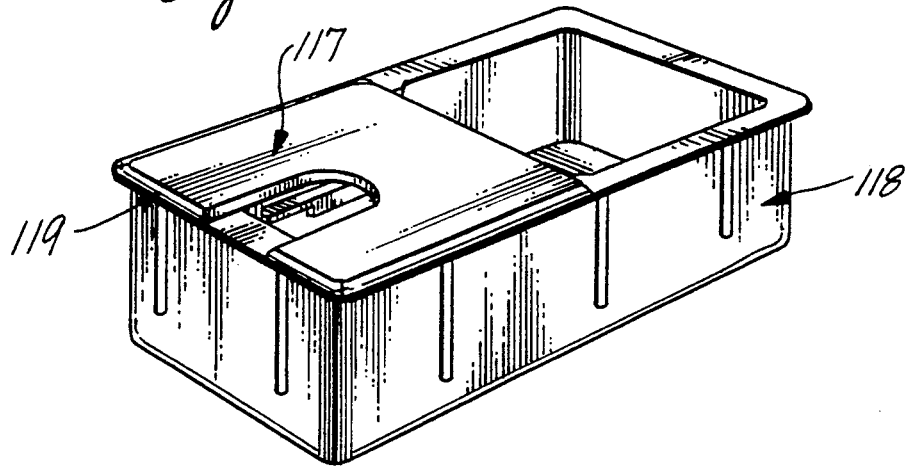

FIG. 25 shows a bottom plan view of both caps arranged in this fashion with one of the closure members 18 in its closed position and the other in its opened and retracted position. FIG. 26 shows the caps symmetrically arranged with the marginal edge of each slot opening 119 opposed to one another and in cooperation with the opposite narrow edges of the rectangular liner 118. FIG. 27 shows the caps symmetrically arranged within the rectangular liner such that the marginal edge of each cap slot opening 119 abuts the other. FIG. 28 shows a single square cap 117 residing within the rectangular liner 118.

Figure 29:
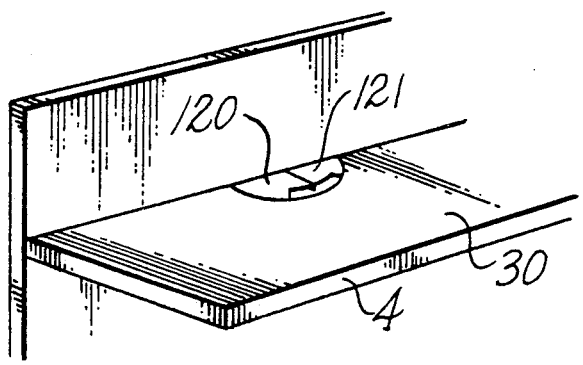
Figure 31:
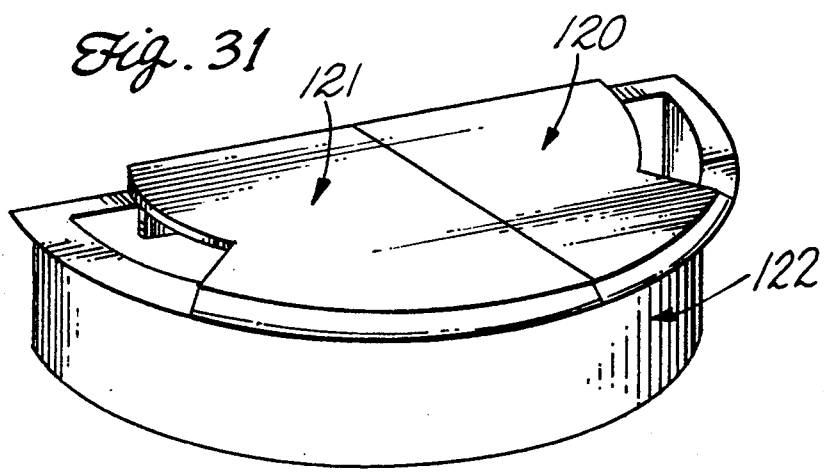
Figure 32:
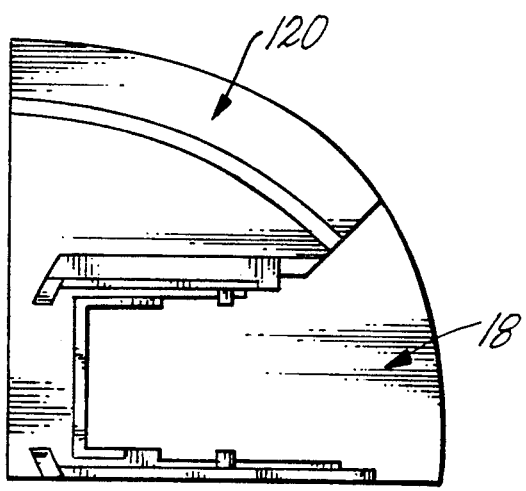
FIG. 32 is a plan view of the underside of a cap useful in the grommet assembly shown in FIGS. 29-31 with the closure member shown in its closed position.

Caps 120 and 121 (FIG. 30) are configured in the shape of a quadrant of a circle for use in a furniture wiring aperture or liner having either a quadrant, semi-circularly, or completely circularly shaped furniture wiring aperture. FIG. 29 shows the practical application of caps 120 and 121 within a semi-circularly shaped furniture wiring aperture positioned where the furniture surface adjoins a vertical wall. Caps 120 and 121 each have an opening along the marginal edge of their arc length that extends circumferentially from a position proximate the center of the cap's arc length to the quadrant's radial edge; a closure member cooperates with this opening in the manner described above. Caps 120 and 121 are different (mirror images of each other) because of the opposed placement of each cap's opening. That is, cap 120 is a left-hand cap and cap 121 is a right-hand cap. FIGS. 30 and 31 show caps 120 and 121 combined to fit within a semi-circular shaped liner 122 having a diameter approximately equal to twice the cap's radius. The caps are arranged within the semi-circular liner such that the circumferential edge of each cap cooperates with the circumferential edge of the liner. The position of each cap's opening within the liner is dependent upon which of two possible ways the caps are combined. FIG. 30 shows the caps arranged with the cap openings abutting one another, forming one continuous opening. FIG. 31 shows the caps arranged with the cap openings occupying diametrically opposed positions within the semi-circular liner. FIG. 32 shows a bottom plan view of a quadrant-shaped cap 120 with the closure member 18 in the closed position. Two caps 120 or two caps 121 could be used with liner 122, if desired.

Each of caps 100, 102, 110, 112, 117, 120 and 121 can be used with or without a cooperating wiring aperture liner, as desired. The use of an aperture liner is preferred. Further, the configurations of caps 113, 114, 117, 120 and 121 permit a variety of cap and accommodating furniture wiring aperture or liner use combinations. For example, in FIG. 30 the quadrant shaped cap 120 could either be used alone within the a semi-circular shaped liner 122 or combined with cap 121 to fully occupy the liner.

The foregoing description of presently preferred and other arrangements of wire management grommets is not intended as, nor is it to be understood to be, an exhaustive catalog of all grommet arrangements according to this invention. The foregoing descriptions and the accompanying drawings show that the invention can be practiced in diverse ways in grommet plug members of many different shapes and sizes. Therefore, the foregoing descriptions support and give meaning, scope and vitality to the following claims which are to be read and interpreted as broadly as is consistent with the relevant art and technology and with those descriptions and things equivalent to those which have been described.

What is claimed is:

1. A cover for a wiring aperture through a surface of an item of furniture, the cover comprising a plug member and a closure member for an opening formed in the plug member, the plug member including a body having a planform shape similar to but larger in dimension than a selected portion of a selected wiring aperture to be covered and a substantially flat obverse surface, projection means depending from a reverse surface of the body for mating with boundaries of the aperture to be covered and for positioning the plug member in the aperture with a peripheral margin of the body in overlying relation to the surface in which the aperture is present, the projection means being located on the body about a space which opens away from the body reverse surface, the plug member opening being defined in the body with side and inner end edges in the body obverse surface and extending from inwardly of the body peripheral margin to and through the body peripheral margin, the closure member for the body opening being captive to the body and movable relative to the body between a) a closed position in which the closure member closes the opening and has an edge thereof essentially continuous with the body peripheral margin adjacent the opening, and b) an open position in which the closure member depends from the body reverse surface in the space without projection above the body obverse surface and in which the opening as defined by said side and end edges thereof is fully open through the body, the closure member having an obverse surface substantially flush with the body obverse surface in the closed position of the closure member.

2. A wiring aperture cover according to claim 1 including means cooperating between the plug and closure member for releasibly holding the closure member in its closed position.

3. A wiring aperture cover according to claim 2 wherein the means cooperating between the plug and closure members includes means confining part of the motion of the closure member relative to the body into and out of the closed position to sliding motion.

4. A cover for a wiring aperture as recited in claim i comprising means integral to the body affording slidable cooperation of the closure member within the plug member opening.

5. A cover for a wiring aperture as recited in claim 4 comprising means integral to the body limiting sliding of the closure member away from the plug member opening to a position within the opening where the closure member can rotate downward to its open position.

6. A cover for a wiring aperture as recited in claim 1 comprising means integral to the body affording captive cooperation of the closure member within the body and accommodating pivoting of the closure member to and from its open position.

7. A cover for a wiring aperture as recited in claim 1 comprising means integral to the body affording locking cooperation between the closure member and the body when the closure member is inserted completely within plug member opening.

8. A wire management grommet comprising:
an annular liner substantially in the form of a generally hollow cylindrical sleeve;
a cap having a skirt sized to fit snugly yet releasably within the sleeve;
an opening formed in the cap with side and inner end edges in an obverse surface of the cap, the opening extending from proximate an inner portion of the cap to an outer marginal edge of the cap;
a closure member cooperating with the opening, the closure member being captive to and movable within the cap and having a boss in the obverse surface thereof at a first end thereof and a second opposite end;
means for fitting and locking the closure member within the opening; and
means for affording motion of the closure member from a position closing the opening to a position fully exposing the opening as defined by the side and end edge thereof, both the closure member and the means for affording motion being substantially hidden in a topside view of the cap when the closure member is in its position fully exposing the opening.

9. A grommet as recited in claim 8 wherein the cap comprises:
an underside surface having a set of parallel ribs depending from the surface and positioned adjacent to each side of the opening.

10. A grommet as recited in claim 9 wherein each rib further comprises a flange integral to the rib, each flange originating proximate the midpoint of the rib's length and depending from the rib's surface.

11. A grommet as recited in claim 8 wherein
said body has a shape and size conforming with the opening, the cap's surface, and the cap's marginal edge when fitted within the opening; and
the closure member comprises a pair of tongues extending outwardly away from each side of the closure member proximate the boss.

12. A grommet as recited in claim 8 wherein the means for fitting and locking the closure member within the opening comprises
a pair of grooves formed between the underside surface of the cap and a cooperating pair of ribs integral to the cap, the grooves being positioned adjacent the opening;
a pair of tongues, each extending perpendicularly outward away from the closure member proximate the boss, the tongues being sized to permit slidable interaction within the grooves allowing the closure member to fit within the opening;
a detent recess located in the cap's underside positioned adjacent to the opening; and
a detent boss extending outwardly away from the top surface of the tongue, the cooperative interaction between the detent recess and detent boss upon alignment causing the closure member to hold position in the opening.

13. A grommet as recited in claim 8 wherein the means for affording motion of the closure member from a position closing the opening to a position exposing the opening comprises
a set of pins carried by the closure member each pin extending perpendicularly outward from said opposite end of the closure member;
a set of parallel ribs depending from the underside of the cap, each rib being positioned adjacent a respective edge of the opening; and
a set of grooves formed between the cap's underside surface and the ribs, the grooves being sized to accommodate the slidable interaction of the closure member through the pin and groove interaction, the pin and groove arrangement permitting the hingeable rotation of the closure member within the cap.

14. A wire management grommet comprising an annular liner having a hollow cylindrical sleeve;

a cap engageable in the sleeve and having an opening formed through a principle surface of the cap, the opening extending to and through an edge margin of the cap;

a closure member captive to the cap;

means for enabling the closure member to interlock with the cap;

means for enabling the closure member to slide within the cap opening substantially parallel to the cap top surface and be a captive component of the cap; and means for enabling the closure member to pivot relative to the cap about an axis parallel to the cap top surface.

15. A grommet as recited in claim 14 wherein the means for enabling the closure member to interlock with the cap comprises a tongue and groove arrangement, the tongue being carried by the closure member and the groove being formed between the cap's underside surface and ribs carried by the cap, the ribs being of sufficient distance from the cap's underside to permit the slidable engagement of the tongue within the groove when the closure member is moved into the opening; and a detent arrangement comprising a detent recess and a detent boss, the closure member having a detent element complimentary to the detent element of the cap, the location of the detent recess and boss being such that alignment of both detent elements is achieved upon the insertion of the closure member completely within the opening.

16. A grommet as recited in claim 14 wherein the means for enabling the closure member to slide within the cap and be a captive component of the cap comprises a pin and groove arrangement, the pin being carried by and extending outwardly from the closure member, the groove being carried by the cap;

a stop carried by the cap serving to limit travel of the closure member towards the mouth of the opening; and a skirt depending from the cap's underside and blocking the closure member to prevent disengagement of the pin and groove arrangement.

17. A grommet as recited in claim 14 wherein the means for enabling the closure member to pivot comprises a pin and groove arrangement cooperating between the closure member and the cap for providing slidable and hingeable movement of the closure member relative to the cap;

flange means carried by the cap positioned along the closure member's path of travel;

wall means carried by the closure member, the interaction between the wall and flange means serving to stabilize and guide the movement of the closure member toward and away from the underside of the cap; and means carried by the closure member for limiting hinging motion of the closure member relative to the cap.

18. A cover for a wiring aperture through a surface of an item of furniture, the cover comprising at least one plug member and a closure member for an opening formed in the plug member, the plug member including a body having a planform shape similar to but larger in dimension than a corresponding portion of a selected wiring aperture to be covered by the cover, the plug member having a substantially flat obverse surface, projection means depending from a reverse surface of the body for mating with boundaries of the wiring aperture and for positioning the plug member in the aperture with a peripheral margin of the body in overlying relation to a surface adjacent the aperture, the projection means being located on the body about a space substantially centrally of the body which opens away from the body reverse surface, the plug member opening being defined in the body with side and end edges in the body obverse surface and extending from an inner portion of the body to and through an edge of the body, the closure member for the body opening being captive to the body and movable relative to the body between a) a closed position in which the closure member closes the opening and has an edge thereof essentially continuous with the body edge adjacent the opening, and b) an open position in which the closure member depends from the body reverse surface in the space without projection above the body obverse surface and in which the opening as defined by said side and end edges thereof is fully open through the body.

19. A wiring aperture cover according to claim 18 wherein the cover comprises a pair of plug members configured for cooperation with each other in the wiring aperture.

20. A wiring aperture cover according to claim 19 wherein the openings in the plug members are located in each plug member for registration with the opening in the other plug member upon cooperation of the plug members with each other in the aperture.

21. A wire management grommet for routing wire through a wiring aperture formed in a surface of furniture, the grommet comprising an annular liner and a cover, the liner having a hollow cylindrical sleeve of shape and dimension substantially similar to the aperture to permit cooperation within a furniture wiring aperture, the cover comprising at least one plug member for closing a substantial portion of a hole formed by the liner and a closure member for an opening formed in the plug member, the plug member including a body having a planform shape similar to but larger in dimension than a corresponding portion of a selected wiring aperture to be at least partially covered by the cover, the plug member having a substantially flat obverse surface, projection means depending from a reverse surface of the body for mating with boundaries of the liner sleeve seated within the furniture wiring aperture, the projection means serving to position the plug member in the sleeve with a peripheral margin of the body in overlying relation to a surface adjacent the aperture, the projection means being located on the body about a space substantially centrally of the body which opens away from the body reverse surface, the plug member opening being defined in the body with side and end edges in the body obverse surface and extending from an inner portion of the body to and through an edge of the body, the closure member for the body opening being captive to the body and movable relative to the body between a) a closed position in which the closure member closes the opening and has an edge thereof essentially continuous with the body edge adjacent the opening, and b) an open position in which the closure member depends from the body reverse surface in the space without projection above the body obverse surface and in which the opening as defined by the side and end edges thereof is fully open through the body.

22. A wire management grommet as recited in 21 wherein the liner comprises a sleeve having a rectangular planform shape.

23. A wire management grommet as recited in 22 wherein the plug member comprises a square planform shape of sufficient size to permit cooperation within the rectangular sleeve.

24. A wire management grommet as recited in 23 wherein the aspect ratio of the sleeve is substantially 2:1.

25. A wire management grommet as recited in 21 wherein the liner comprises a sleeve having at least a portion of its perimeter circularly cylindrical in shape.

26. A wire management grommet as recited in 25 wherein the plug member has a planform shape which is substantially a quadrant of a circle of sufficient radius to permit cooperation within the circularly cylindrical-shaped sleeve.

27. A wire management grommet as recited in 26 wherein the number of quadrant-shaped plug members accommodated by the sleeve depends upon whether the circularly cylindrical-shaped portion of the sleeve comprises 90, 180, 270, or 360 degrees.

* * * * *

(12) EX PARTE REEXAMINATION CERTIFICATE (4918th)
United States Patent
Plumley

(10) Number: US 5,167,047 C1
(45) Certificate Issued: Mar. 16, 2004

(54) WIRE MANAGEMENT GROMMET

(75) Inventor: Roger K. Plumley, 266 S. Marengo, Pasadena, CA (US) 91101

(73) Assignee: Roger K. Plumley, Pasadena, CA (US)

Reexamination Request:
No. 90/006,520, Jan. 21, 2003

Reexamination Certificate for:
Patent No.: 5,167,047
Issued: Dec. 1, 1992
Appl. No.: 07/861,643
Filed: Apr. 1, 1992

Related U.S. Application Data

(63) Continuation-in-part of application No. 07/770,019, filed on Oct. 1, 1991, now abandoned.
(51) Int. Cl.$^7$ .......................... H02G 3/22; H01B 17/26; F16L 5/00
(52) U.S. Cl. ....................... 174/153 G; 174/48; 16/2.1; 248/56
(58) Field of Search ............................... 174/153 G, 48, 174/65 G, 151 G; 16/2.1, 2.2; 248/56

(56) References Cited

U.S. PATENT DOCUMENTS 5,144,777 A * 9/1992 Fishel et al. ............ 174/153 G

* cited by examiner

*Primary Examiner*—Dean A. Reichard

(57) ABSTRACT

A wire management grommet for routing wiring or cables through the surface of furniture articles comprises a liner and a cap having a slot opening and a captive closure member. A tongue and groove arrangement facilitates slidable movement of the closure member within the cap's slot opening. The closure member is locked into its closed position covering the slot through a detent mechanism. A pin and groove arrangement facilitates both the closure member's captivity to the cap and its downward pivoting movement away from the slot opening and into its retracted position. The closure member is stabilized, through interaction with the cap, when the closure member is in its open position. The operation of the closure member from its closed position covering the slot opening to its retracted position exposing the opening comprises three distinct movements.

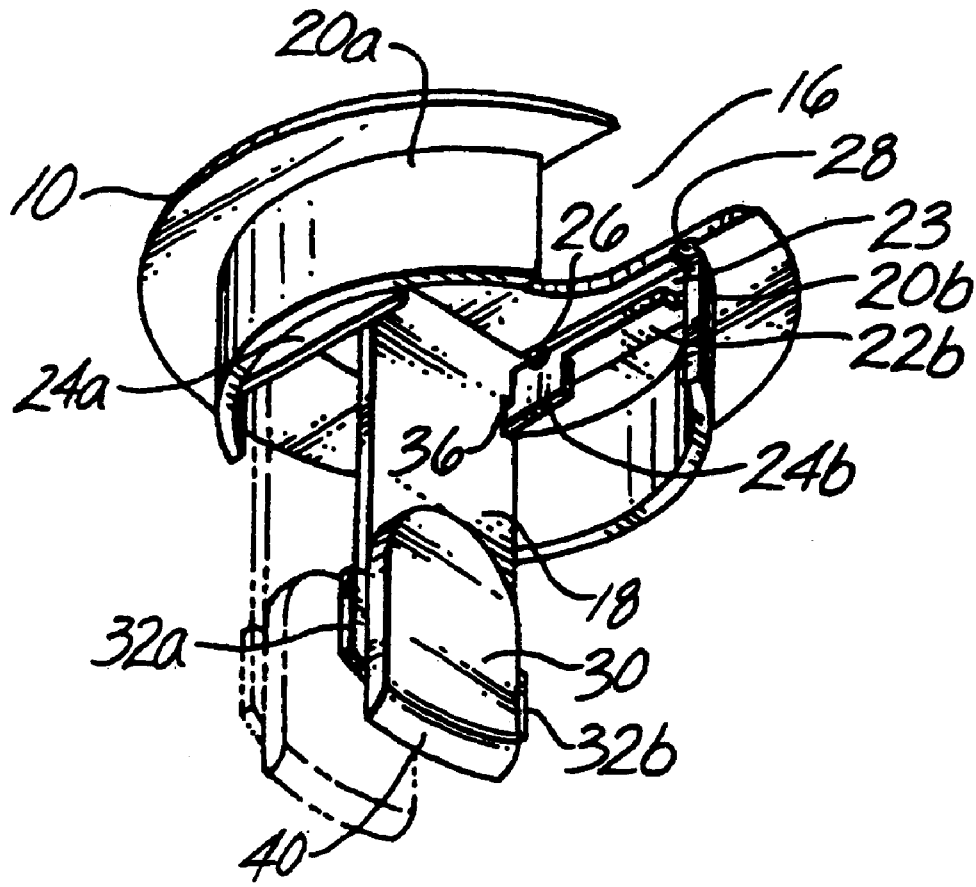

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–27 is confirmed.

* * * * *

(12) EX PARTE REEXAMINATION CERTIFICATE (6390th)
United States Patent
Plumley

(10) Number: US 5,167,047 C2
(45) Certificate Issued: Aug. 19, 2008

(54) WIRE MANAGEMENT GROMMET

(76) Inventor: Roger K. Plumley, 266 S. Marengo, Pasadena, CA (US) 91101

Reexamination Request:
No. 90/006,905, Jan. 14, 2004
No. 90/007,378, Jan. 21, 2005

Reexamination Certificate for:
Patent No.: 5,167,047
Issued: Dec. 1, 1992
Appl. No.: 07/861,643
Filed: Apr. 1, 1992

Reexamination Certificate C1 5,167,047 issued Mar. 16, 2004

Related U.S. Application Data

(63) Continuation-in-part of application No. 07/770,019, filed on Oct. 1, 1991, now abandoned.

(51) Int. Cl.
*A47B 21/00* (2006.01)
*H02G 3/08* (2006.01)

(52) U.S. Cl. ............... 174/153 G; 16/2.1; 174/500; 248/56; D8/356

(58) Field of Classification Search ................. None
See application file for complete search history.

(56) References Cited

U.S. PATENT DOCUMENTS

| | | | | |
|---|---|---|---|---|
| 3,857,136 A | * | 12/1974 | Dean .................... | 16/2.1 |
| 4,520,976 A | * | 6/1985 | Cournoyer et al. ...... | 174/153 G |
| 4,688,491 A | * | 8/1987 | Herrera et al. .......... | 174/152 G |
| 4,721,476 A | * | 1/1988 | Zeliff et al. ............. | 174/48 |
| D296,761 S | * | 7/1988 | Mockett ................ | D8/400 |
| 5,144,777 A | * | 9/1992 | Fishel et al. ............ | 174/153 G |

* cited by examiner

*Primary Examiner*—David Harvey

(57) ABSTRACT

A wire management grommet for routing wiring or cables through the surface of furniture articles comprises a liner and a cap having a slot opening and a captive closure member. A tongue and groove arrangement facilitates slidable movement of the closure member within the cap's slot opening. The closure member is locked into its closed position covering the slot through a detent mechanism. A pin and groove arrangement facilitates both the closure member's captivity to the cap and its downward pivoting movement away from the slot opening and into its retracted position. The closure member is stabilized, through interaction with the cap, when the closure member is in its open position. The operation of the closure member from its closed position covering the slot opening to its retracted position exposing the opening comprises three distinct movements.

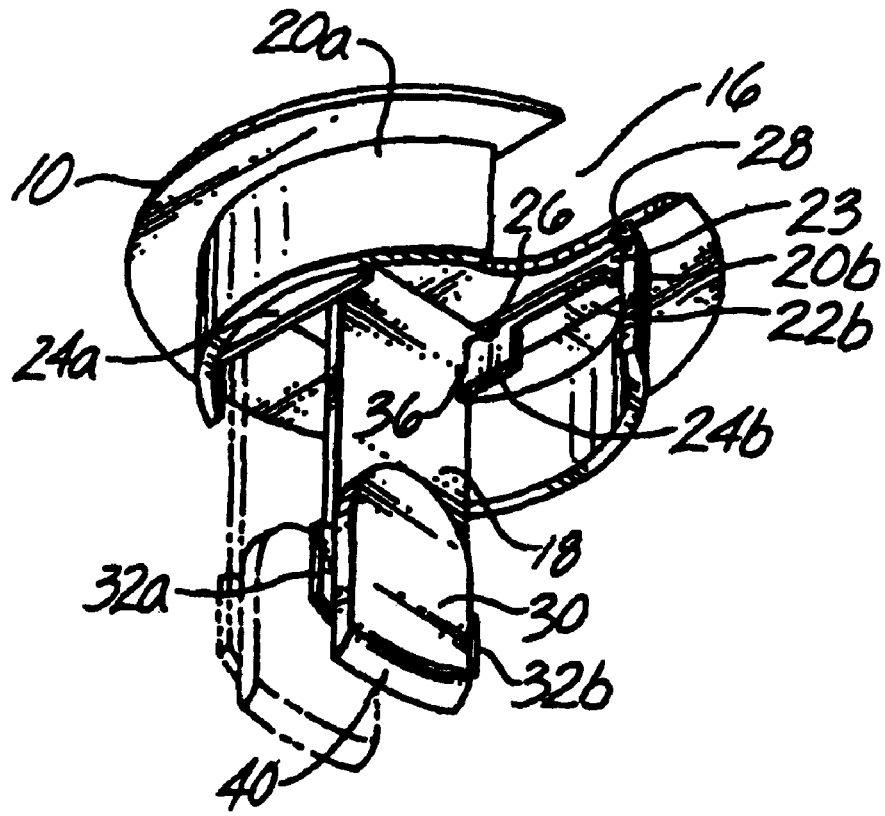

US 5,167,047 C2

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–7 and 14–27 is confirmed.

Claim 8 is determined to be patentable as amended.

Claims 9–13, dependent on an amended claim, are determined to be patentable.

New claims 28–31 are added and determined to be patentable.

8. A wire management grommet comprising:
an annular liner substantially in the form of a generally hollow cylindrical sleeve;
a cap having a skirt sized to fit snugly yet releasably within the sleeve;
an opening formed in the cap with side and inner end edges in an obverse surface of the cap, the opening extending from proximate an inner portion of the cap to an outer marginal edge of the cap;
a closure member cooperating with the opening, the closure member being captive to and movable within the cap and having a boss in the obverse surface thereof at a first end thereof and a second opposite end;
means for fitting and locking the closure member within the opening; and
means for affording motion of the closure member from a position closing the opening to a position fully exposing the opening as defined by the side and end edge thereof, both the closure member and the means for affording motion being substantially hidden in a topside view of the cap when the closure member is in its position fully exposing the opening, *and the closure member depends from a reverse surface of the cap when the closure member is in its position fully exposing the opening.*

28. *A cover for a wiring aperture through a surface of an item of furniture, the cover comprising a plug member and a closure member for an opening formed in the plug member, the plug member including a body having a planform shape similar to but larger in dimension than a selected portion of a selected wiring aperture to be covered and a substantially flat obverse surface, projection means depending from a reverse surface of the body for mating with boundaries of the aperture to be covered and for positioning the plug member in the aperture with a peripheral margin of the body in overlying relation to the surface in which the aperture is present, the projection means being located on the body about a space which opens away from the body reverse surface, the plug member opening being defined in the body with side and inner end edges in the body obverse surface and extending from inwardly of the body peripheral margin to and through the body peripheral margin, the closure member for the body opening being captive to the body and movable relative to the body between a) a closed position in which the closure member closes the opening and has an edge thereof essentially continuous with the body peripheral margin adjacent the opening, and b) an open position in which the closure member depends from the body reverse surface in the space without projection above the body obverse surface and in which the opening as defined by said side and end edges thereof is fully open through the body, the closure member having an obverse surface substantially flush with the body obverse surface in the closed position of the closure member; and wherein the closure member is held captive to the body by a hinge at a location in spaced relation away from the opening.*

29. *The cover for a wiring aperture as recited in claim 28 wherein the hinge further comprises:*
*two hinge lugs on the reverse side of the plug member spaced apart from the opening, each hinge lug having an axle opening; and*
*a hinge axle on the closure member, the hinge axle rotatably fitting inside the axle openings.*

30. *A wire management grommet for routing wire through a wiring aperture formed in a surface of furniture, the grommet comprising an annular liner and a cover, the liner having a hollow cylindrical sleeve of shape and dimension substantially similar to the aperture to permit cooperation within a furniture wiring aperture, the cover comprising at least one plug member for closing a substantial portion of a hole formed by the liner and a closure member for an opening formed in the plug member, the plug member including a body having a planform shape similar to but larger in dimension than a corresponding portion of a selected wiring aperture to be at least partially covered by the cover, the plug member having a substantially flat obverse surface, projection means depending from a reverse surface of the body for mating with boundaries of the liner sleeve seated within the furniture wiring aperture, the projection means serving to position the plug member in the sleeve with a peripheral margin of the body in overlying relation to a surface adjacent the aperture, the projection means being located on the body about a space substantially centrally of the body which opens away from the body reverse surface, the plug member opening being defined in the body with side and end edges in the body obverse surface and extending from an inner portion of the body to and through an edge of the body, the closure member for the body opening being captive to the body and movable relative to the body between a) a closed position in which the closure member closes the opening and has an edge thereof essentially continuous with the body edge adjacent the opening, and b) an open position in which the closure member depends from the body reverse surface in the space without projection above the body obverse surface and in which the opening as defined by the side and end edges thereof is fully open through the body; and wherein the closure member is held captive to the body by a hinge at a location in spaced relation away from the opening.*

31. *The wire management grommet as recited in claim 30 wherein the hinge further comprises:*
*two hinge lugs on the reverse side of the plug member spaced apart from the opening, each hinge lug having an axle opening; and*
*a hinge axle on the closure member, the hinge axle rotatably fitting inside the axle openings.*

\* \* \* \* \*

EX PARTE REEXAMINATION CERTIFICATE (6671st)
United States Patent
Plumley

(10) Number: US 5,167,047 C3
(45) Certificate Issued: Feb. 17, 2009

(54) WIRE MANAGEMENT GROMMET

(76) Inventor: Roger K. Plumley, 266 S. Marengo, Pasadena, CA (US) 91101

Reexamination Request:
No. 90/008,355, Dec. 1, 2006

Reexamination Certificate for:
Patent No.: 5,167,047
Issued: Dec. 1, 1992
Appl. No.: 07/861,643
Filed: Apr. 1, 1992

Reexamination Certificate C2 5,167,047 issued Aug. 19, 2008

Reexamination Certificate C1 5,167,047 issued Mar. 16, 2004

Related U.S. Application Data

(63) Continuation-in-part of application No. 07/770,019, filed on Oct. 1, 1991, now abandoned.

(51) Int. Cl.
*H02G 3/08* (2006.01)
*A47B 21/00* (2006.01)

(52) U.S. Cl. .................. 174/153 G; 174/500; 174/16
(58) Field of Classification Search .................. None
See application file for complete search history.

(56) References Cited

U.S. PATENT DOCUMENTS

| | | |
|---|---|---|
| 3,857,136 A | 12/1974 | Dean |
| 4,344,205 A | 8/1982 | Latino |
| 4,520,976 A | 6/1985 | Cournoyer |
| 4,688,491 A | 8/1987 | Herrera |
| 4,730,363 A | 3/1988 | Asbaghi |
| D296,761 S | 7/1988 | Mockett |

*Primary Examiner*—Linh M. Nguyen

(57) ABSTRACT

A wire management grommet for routing wiring or cables through the surface of furniture articles comprises a liner and a cap having a slot opening and a captive closure member. A tongue and groove arrangement facilitates slidable movement of the closure member within the cap's slot opening. The closure member is locked into its closed position covering the slot through a detent mechanism. A pin and groove arrangement facilitates both the closure member's captivity to the cap and its downward pivoting movement away from the slot opening and into its retracted position. The closure member is stabilized, through interaction with the cap, when the closure member is in its open position. The operation of the closure member from its closed position covering the slot opening to its retracted position exposing the opening comprises three distinct movements.

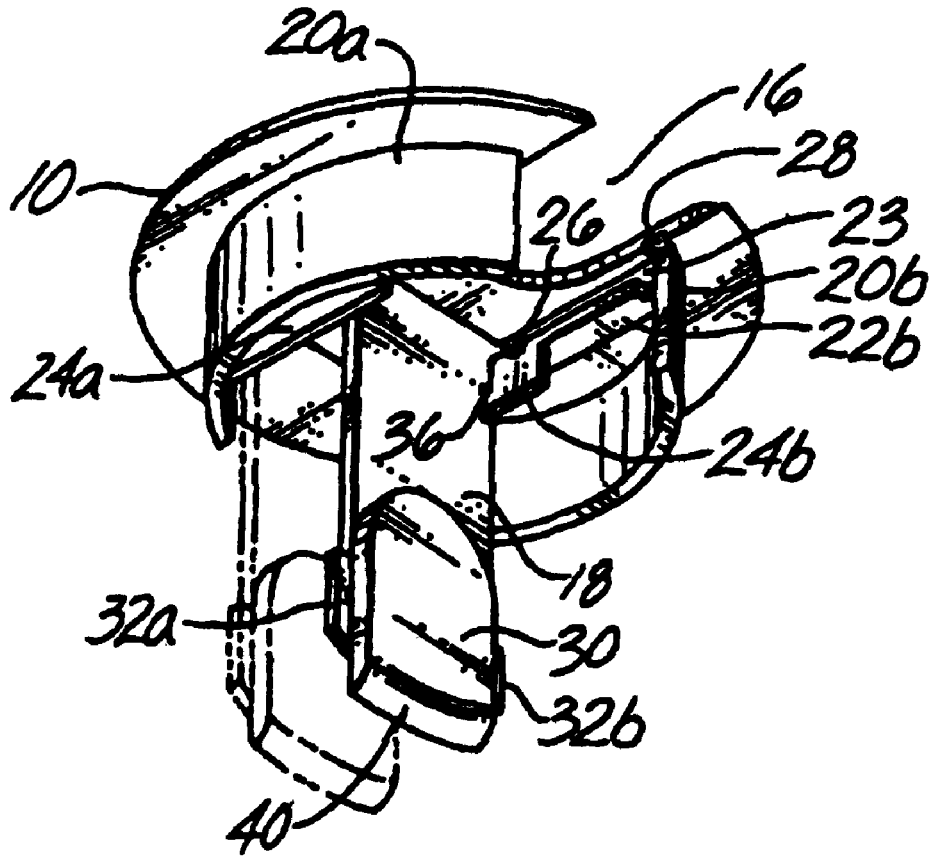

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–4, 6–11, 18, 19, 21–25, 28 and 30 is confirmed.

* * * * *